United States Patent
Morris et al.

(10) Patent No.: US 8,147,197 B2
(45) Date of Patent: Apr. 3, 2012

(54) TURBINE BLADE PLATFORM

(75) Inventors: Mark C. Morris, Phoenix, AZ (US);
Jason Smoke, Phoenix, AZ (US); Jeff Howe, Chandler, AZ (US); Bob Mitlin, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 466 days.

(21) Appl. No.: 12/401,037

(22) Filed: Mar. 10, 2009

(65) Prior Publication Data
US 2010/0232975 A1 Sep. 16, 2010

(51) Int. Cl.
*F01D 5/18* (2006.01)

(52) U.S. Cl. .................. 416/97 R; 416/223 R; 416/233; 416/500

(58) Field of Classification Search .................. 415/115; 416/97 R, 193 A, 212 A, 223 A, 233, 500
See application file for complete search history.

(56) References Cited

U.S. PATENT DOCUMENTS

| | | | |
|---|---|---|---|
| 5,813,835 A | 9/1998 | Corsmeier et al. | |
| 6,120,249 A | 9/2000 | Hultgren et al. | |
| 6,241,467 B1 | 6/2001 | Zelesky et al. | |
| 6,254,333 B1 | 7/2001 | Merry | |
| 6,416,284 B1 | 7/2002 | Demers et al. | |
| 6,431,833 B2 | 8/2002 | Jones | |
| 6,514,037 B1 | 2/2003 | Danowski et al. | |
| 6,554,562 B2 | 4/2003 | Dudebout et al. | |
| 6,638,012 B2 | 10/2003 | Bekrenev | |
| 6,641,360 B2 | 11/2003 | Beeck et al. | |
| 6,942,445 B2 | 9/2005 | Morris et al. | |
| 7,186,089 B2 | 3/2007 | Liang | |
| 7,322,797 B2 * | 1/2008 | Lee et al. | 416/193 A |
| 7,357,623 B2 * | 4/2008 | Leghzaouni et al. | 416/97 R |
| 7,597,536 B1 * | 10/2009 | Liang | 415/138 |
| 7,713,027 B2 * | 5/2010 | Cherolis et al. | 416/97 R |
| 7,806,659 B1 * | 10/2010 | Liang | 416/97 R |
| 2004/0126236 A1 * | 7/2004 | Lee et al. | 416/97 R |
| 2004/0197190 A1 * | 10/2004 | Stec et al. | 416/97 R |
| 2004/0219017 A1 * | 11/2004 | Liang | 416/97 R |
| 2005/0265838 A1 * | 12/2005 | Liang | 416/97 R |
| 2006/0093484 A1 * | 5/2006 | Liang | 416/193 A |
| 2006/0263218 A1 * | 11/2006 | Leghzaouni et al. | 416/97 R |
| 2007/0128031 A1 * | 6/2007 | Liang | 416/97 R |
| 2007/0189898 A1 * | 8/2007 | Hooper et al. | 416/97 R |
| 2008/0101961 A1 * | 5/2008 | Liang et al. | 416/97 R |
| 2008/0145236 A1 * | 6/2008 | Liang | 416/97 R |
| 2009/0047136 A1 * | 2/2009 | Chon et al. | 416/97 R |
| 2009/0252615 A1 * | 10/2009 | Gross | 416/97 R |
| 2009/0324422 A1 * | 12/2009 | Klasing et al. | 416/97 R |
| 2010/0068068 A1 * | 3/2010 | Liang | 416/97 R |
| 2010/0239431 A1 * | 9/2010 | Liang | 416/97 R |
| 2011/0044818 A1 * | 2/2011 | Kuhne et al. | 416/212 A |

* cited by examiner

*Primary Examiner* — Michael Lebentritt
(74) *Attorney, Agent, or Firm* — Ingrassia Fisher & Lorenz, P.C.

(57) ABSTRACT

A turbine blade assembly is provided. The turbine blade assembly comprises a turbine blade comprising a cavity, and a blade platform supporting the turbine blade, the cavity extending into the blade platform. The blade platform comprises an upper surface adjacent the turbine blade and a lower surface comprising a first rib, the cavity extending into the first rib, the first rib coupled to the lower surface, tapering as it extends away from the turbine blade, and comprising a first port extending from the cavity to the upper surface.

20 Claims, 8 Drawing Sheets

TURBINE BLADE PLATFORM

TECHNICAL FIELD

Embodiments of the subject matter described herein relate generally to turbines. More particularly, embodiments of the subject matter relate to platforms of turbine blades.

BACKGROUND

Jet engines and other turbomachines employ turbines in a heated environment to produce power. Because of the design of such equipment, the power increases as the temperature in which the turbine operates increases. Consequently, it is beneficial to have components of the turbine which can withstand higher operating temperatures. Such components can include not only the turbine blades, but also the platform on which the turbine blades are supported.

Turbine blades are typically cooled to increase the temperature range in which they can effectively perform. In some turbines, the turbine blade platform can also be cooled, although it is usually incident to the cooling of the blade. Because the turbine blade has the largest exposed surface area and rotates at the extreme outer radius of the turbine's rotation, it is generally thought to experience the highest combination of stresses and temperature.

Because the turbine blade platform couples the turbine blade to other components of the turbine, the rotation of the turbine imparts stresses to the blade platform as well. Additionally, because the blade platform is exposed to the high temperature environment, it can experience failure modes where the combination of heat and stress cause plastic deformation. The combination of heat and stress experienced by the blade platform can be sufficient to cause plastic deformation even when the same conditions do not cause failure, through plastic deformation or otherwise, of the turbine blade.

BRIEF SUMMARY

A turbine blade assembly is provided. The turbine blade assembly comprises a turbine blade comprising a cavity, and a blade platform supporting the turbine blade, the cavity extending into the blade platform. The blade platform comprises an upper surface adjacent the turbine blade, a lower surface, and a first rib, the cavity extending into the first rib, the first rib coupled to the lower surface, tapering as it extends away from the turbine blade, and comprising a first port extending from the cavity to the upper surface.

Another turbine blade assembly is provided. The turbine blade assembly comprises a turbine blade comprising a cavity, and a blade platform supporting the turbine blade, the cavity extending into the blade platform. The blade platform comprises an upper surface adjacent the turbine blade, and a lower surface comprising a first rib, the first rib extending downward from the lower surface, the cavity extending into the first rib, the first rib tapering as it extends away from the turbine blade, and the first rib comprising a first port, the first port adapted to direct a fluid from within the cavity to impinge the lower surface adjacent the first rib.

Another turbine blade assembly is provided. The turbine blade assembly comprises a turbine blade comprising a first cavity, and a blade platform supporting the turbine blade, the first cavity extending into the blade platform, the blade platform having a first lateral side. The blade platform comprises an upper surface adjacent the turbine blade, a lower surface comprising a first rib extending away from the turbine blade, the first rib comprising a second cavity and a first remote tip proximate the first lateral side, the first and second cavities in fluid communication, and a second rib extending away from the turbine blade, the second rib comprising a third cavity and a second remote tip proximate the first lateral side, the first and third cavities in fluid communication, and a first conduit extending from the first remote tip to the second remote tip and placing the second and third cavities in fluid communication.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
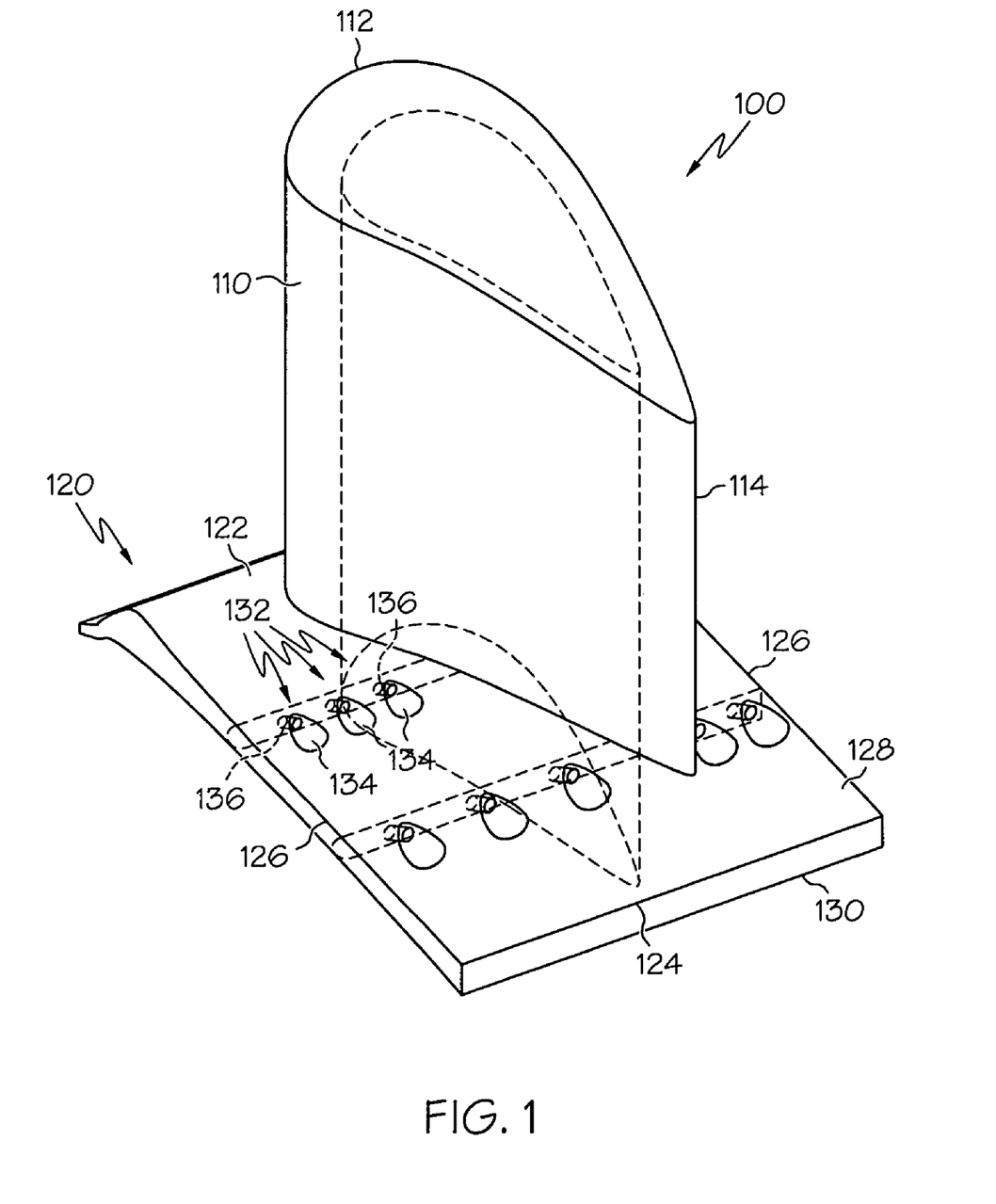
FIG. 1 is a perspective view of an embodiment of a turbine blade assembly.

"Coupled"—The following description refers to elements or nodes or features being "coupled" together. As used herein, unless expressly stated otherwise, "coupled" means that one element/feature is directly or indirectly joined to (or directly or indirectly communicates with) another element/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus is not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

To reduce the detrimental effects of both stress and heat experienced by a turbine blade platform, it is desirable to introduce both supporting members and specific cooling. The combination of heat and stress results in damage or deformation of the turbine blade platform when the material composing the platform exceeds its elastic strain limit for the currently-experienced temperature. Accordingly, by reducing the temperature through cooling, and reducing the strain caused by the received stress by supporting the highest strained portions of the blade platform, the operating temperature in which the blade platform can function effectively is increased. After testing, it has been discovered that the region of earliest plastic deformation, caused by heat and stress, is not always in the turbine blade airfoil, but can occur in a surface of the blade platform adjacent the turbine blade airfoil. Accordingly, by supporting the exposed surface of the blade platform with ribs, the performance of the turbine can be increased. Additionally, cooling the surface with a cooling fluid introduced into the ribs can be accomplished by conduction through the blade platform to the interior of the ribs and through convection, by impinging a flow of the cooling fluid onto the blade platform, such as by underneath, or by emitting a flow of the cooling fluid as a film onto the surface of the blade platform.

FIG. 1 illustrates a perspective view of an embodiment of a turbine blade assembly 100 comprising a turbine blade airfoil 110 and a blade platform 120. The turbine blade airfoil 110 extends upwards from the blade platform 120, as shown. The turbine blade airfoil 110 has a leading edge 112 and a trailing edge 114. The blade platform 120 supports the turbine blade airfoil 110 and inhibits combusted material from leaving the flowpath and entering the turbine cavity between the turbine blades. The blade platform 120 has a leading edge 122, a trailing edge 124 and two lateral edges 126. Additionally, the blade platform 120 has both an upper surface 128 and a lower surface 130. The illustrated blade platform 120 additionally has a plurality of ports 132, each port 132 has an outlet 134 and a conduit 136. As described in greater detail below, the number of ports 132, as well as their arrangement, can vary between embodiments. The conduit 136 connects the outlet 134 to a cavity 138, shown in FIG. 2 and described in greater detail below. Each cavity 138 is, in turn, connected to a turbine blade cavity 140, which is defined within the turbine blade airfoil 110.

Figure 2:
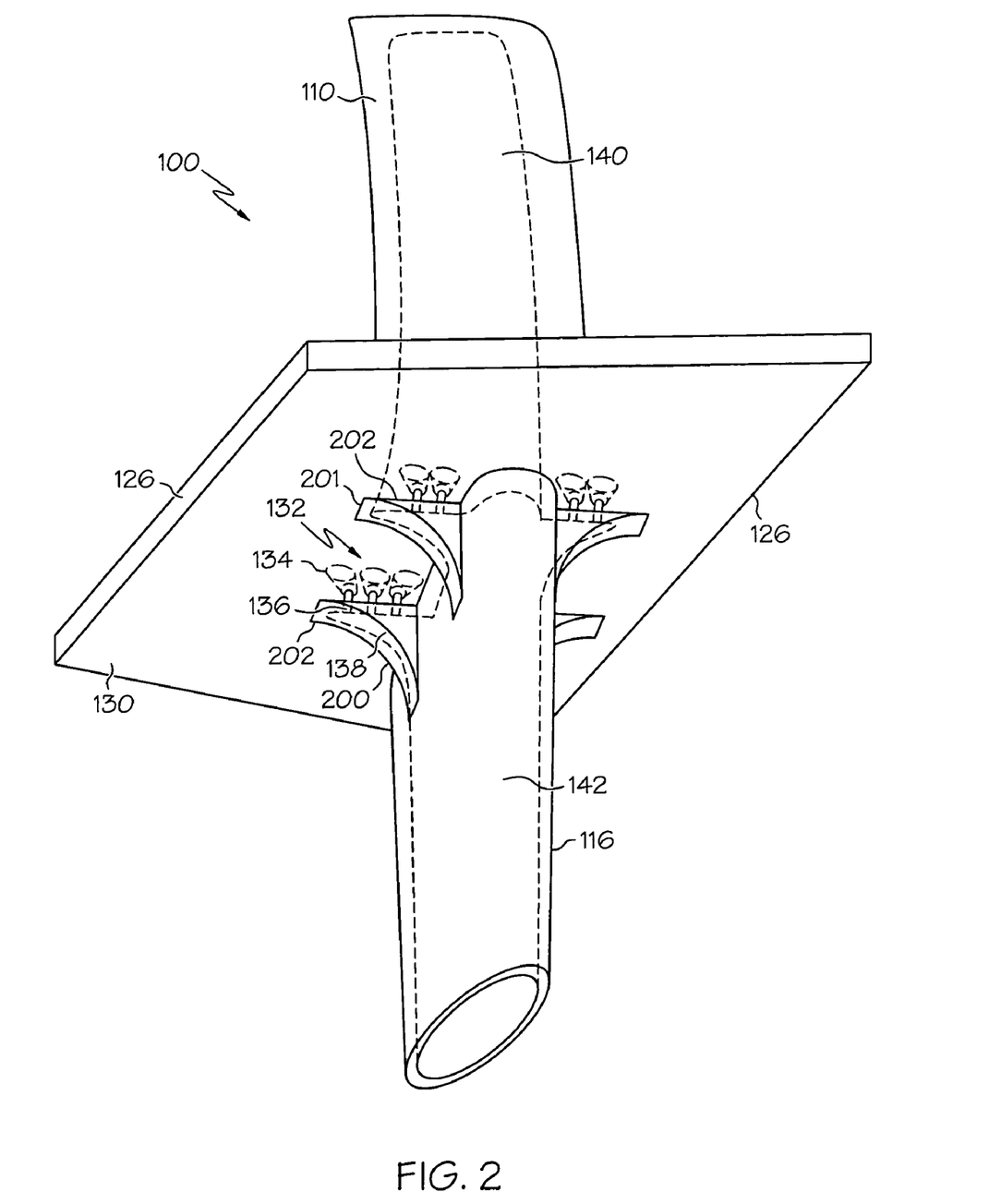
FIG. 2 is a perspective view of the underside of the turbine blade assembly of FIG. 1.

With reference to FIG. 2, the underside of the blade platform 120 is visible, including the lower surface 130. The turbine blade cavity 140 can extend downward into a blade root 116, and is referred to as the blade root cavity 142. In certain embodiments, the turbine blade cavity 140 can be continuous with the blade root cavity 142. In other embodiments, they may be fluidly isolated, or connected through one or more channels. The turbine blade cavity 140 and blade root cavity 142 are collectively referred to as the central cavities 140, 142, and are outlined with dashed lines in FIGS. 1-3, currently referenced.

The turbine blade assembly 100 may include a number of ribs 200 that are designed to increase the stiffness of the blade platform 120, as described in greater detail below. A plurality of ribs 200 is visible in FIG. 2. Each rib 200 can extend outward toward a lateral edge 126 of the blade platform 120, as shown. Preferably, the ribs 200 taper, with a reducing thickness the farther they extend from the blade root 116, or relative to the turbine blade airfoil 110. Thickness and taper of the ribs 200 is described relative to their height away from the lower surface 130. Thus, the ribs 200 are thickest near the union of the rib 200 and the blade root 116 and thinnest at a remote tip 202 of each rib 200. Each rib 200 can have a curved surface 201, such as the underside, or can be an angular member, but preferably each rib 200 tapers as shown.

The illustrated embodiments are not to scale, and the proportion of each rib 200 relative to the blade root 116, the lower surface 130, and the turbine blade airfoil 110 can vary between embodiments. Additionally, although four ribs 200 are illustrated, more or fewer can be used in an embodiment, without limitation. Thus, certain embodiments of the turbine blade assembly 100 can have only a single rib 200, while other embodiments can have two or more.

Preferably, the ribs 200 are situated beneath the locations of maximum strain of the blade platform 120. Each rib 200 can be integrally formed with the lower surface 130 and/or blade root 116. In certain embodiments, some or all of the ribs 200 can be separate components coupled as shown. The ribs 200 can be coupled using a fastener, adhesive, mechanical coupling, brazing, welding, or any other desired technique.

Figure 3:
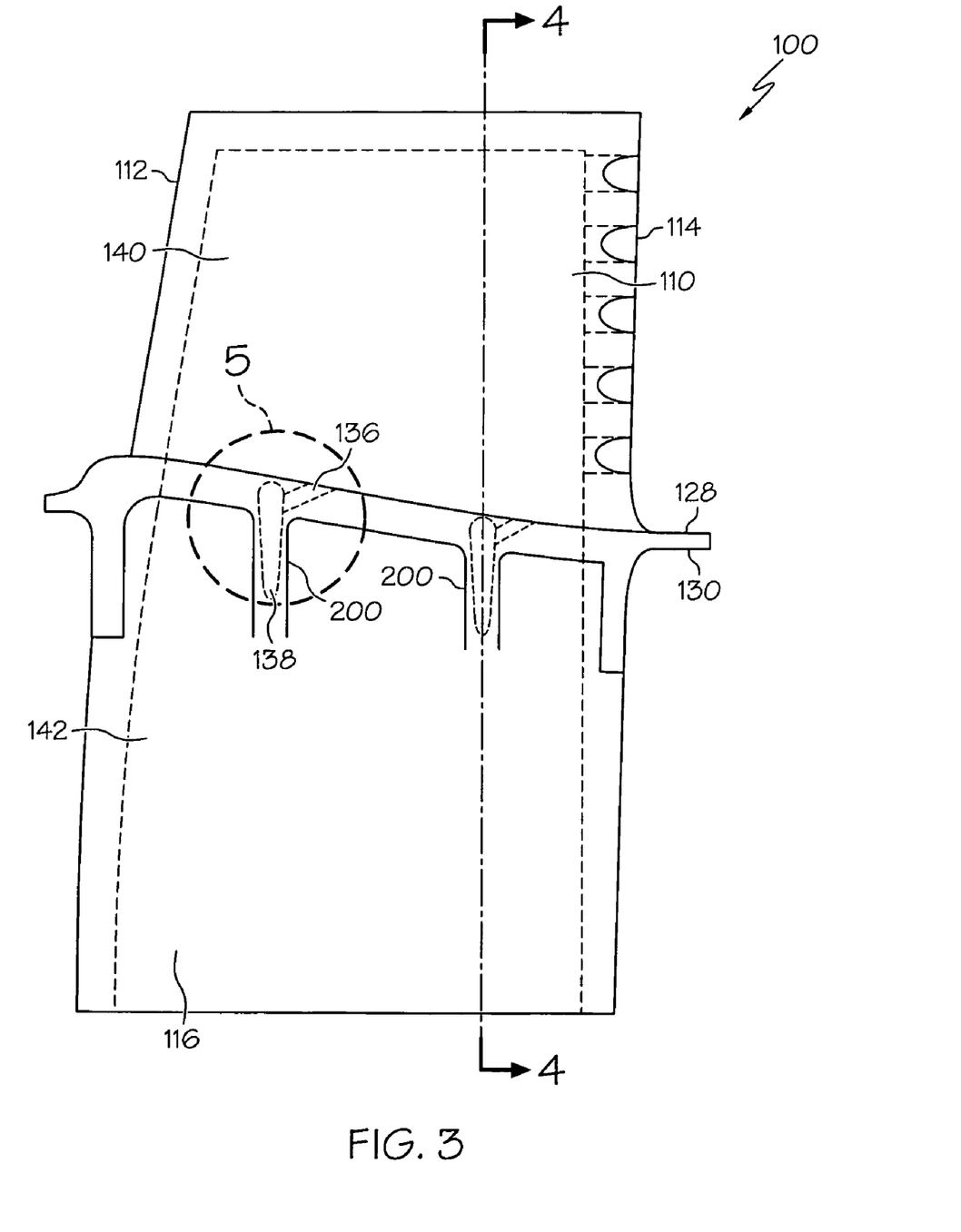
FIG. 3 is a side view of the turbine blade assembly of FIG. 1.

FIG. 3 illustrates a side view of the embodiment of FIG. 1. Each rib 200 comprises a cavity 138, which can be an extension of the blade root cavity 142 and/or turbine blade cavity 140. When integrally formed with other components of the turbine blade assembly 100, the ribs 200 can be hollow, and the cavity 138 within each one can be an extension of the other cavities 140, 142. In certain embodiments, the cavities 138 can be fluidly isolated from the central blade cavities 140, 142, and fluid communication established by one or more conduits or tubes connecting each cavity 138 to the central blade cavities 140, 142.

Additionally, each rib 200 can comprise a conduit 136 formed therein. The conduit 136 can connect the cavity 138 with an outlet 134, forming a port 132. Thus, fluid from within the blade root cavity 142 can flow into the cavity 138, and through the conduit 136 to exit the port 132 through the outlet 134 on the upper surface 128. Each conduit 136 is preferably sized and shaped to create the desired flow characteristics. Additionally, although the outlets 134 are shown as having a teardrop shape, when viewed from above the upper surface 128, they can have other shapes, as desired. For example, they can also have a circular shape, a triangular shape, and so on.

Figure 4:
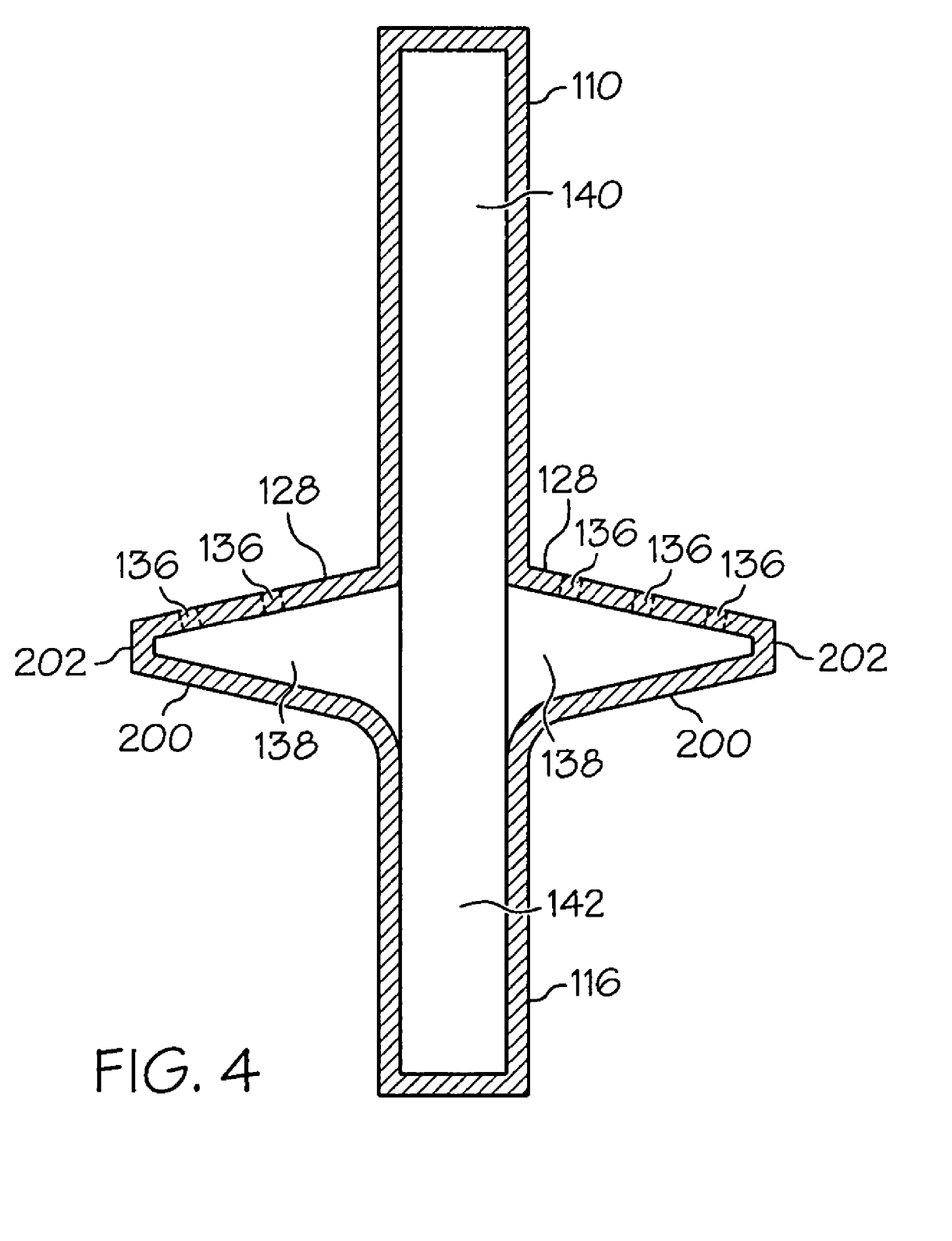
FIG. 4 is a cross-sectional view of the turbine blade assembly of FIG. 3, taken along the line 4-4.

FIG. 4 illustrates a cross-sectional view of the turbine blade assembly 100 taken along the line 4-4, as shown in FIG. 3. The internal spaces of the assembly 100 are more easily visible, including the central cavities 140, 142, cavities 138 of the ribs 200, and certain other features, such as the taper of the ribs 200, as they extend away from the turbine blade airfoil 110 and/or blade root 116 to the remote tips 202 of the ribs 200. The conduits 136 extending from a cavity 138 to the upper surface 128 are also visible.

Preferably, the ribs 200 are composed of the same material as the turbine blade airfoil 110, blade root 116 and/or surfaces 128, 130 of the blade platform 120. For example, the ribs 200 can be composed of a stainless steel, aluminum, titanium, or any alloy thereof, a superalloy, such as a nickel- or cobalt-based superalloy. The ribs 200 are preferably positioned at appropriate locations to add stiffness to the blade platform 120, thereby reducing the strains produced in the blade platform 120 as a result of stresses experienced by the blade platform 120 during operation. Each rib 200 configuration therefore can be determined individually for each embodiment of the blade platform 120.

Figure 5:
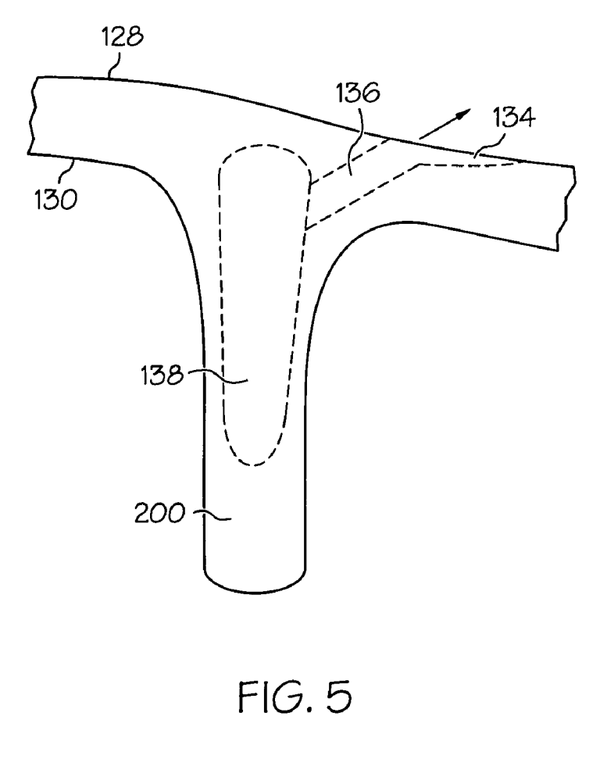
FIG. 5 is a detailed view of a region of the turbine blade assembly of FIG. 3.

FIG. 5 illustrates a detailed view of a portion of the side view of FIG. 3. The rib 200 is viewed end-on, and the cavity within 138 is shown in dashed lines. Additionally, the conduit 136 extending to the outlet 134 is shown. The outlet 134 can comprise a depression in the upper surface 128, as shown. As can be seen in FIGS. 1-4, a plurality of ports 132 can be present in the blade platform 120. The number of ports 132 can vary between different embodiments of the blade platform 120, as described, including the layout and/or arrangement of locations. Not only can the number of ports 132 vary between embodiments, the number of ports 132 connected to each cavity 138 can vary between embodiments. Thus, while some cavities 138 are shown as connected to two ports 132, while other cavities 138 are connected to three ports 132, the exact number can vary between one port 132 per cavity 138 to as many ports 132 as is practicable and/or desired for the embodiment.

In addition to the embodiment shown, certain embodiments can have no ports 132, which results from omitting the outlets 134 and conduits 136. The conduits 138 can remain, but the interior of each rib 200 will not be in fluid communication with the exterior environment of the upper 128 or lower surfaces 130. Thus, certain embodiments of the turbine blade assembly 100 can have only cavities 138 within the ribs 200.

During operation, a fluid, such as a cooling gas, can be introduced into the blade root cavity 142. Because the turbine blade cavity 140 is connected to the blade root cavity 142, the fluid can travel throughout the interior of the turbine blade assembly 100. Additionally, the fluid can travel from the central cavities 140, 142 to each cavity 138 in each rib 200. The cooling fluid can reduce the temperature of the blade platform 120 through convection with the inner surfaces of the ribs 200, in the cavities 138, as well as the conduits 136. Additionally, the fluid can travel through the conduits 136 to the upper surface 128 and be expelled through the outlets 134. The fluid is illustrated by an arrow indicating a direction of travel exiting the outlet 134. In certain embodiments, appropriate control of the fluid can result in a film layer of the fluid being present along the upper surface 128, enhancing the cooling effects of the fluid.

Figure 6:
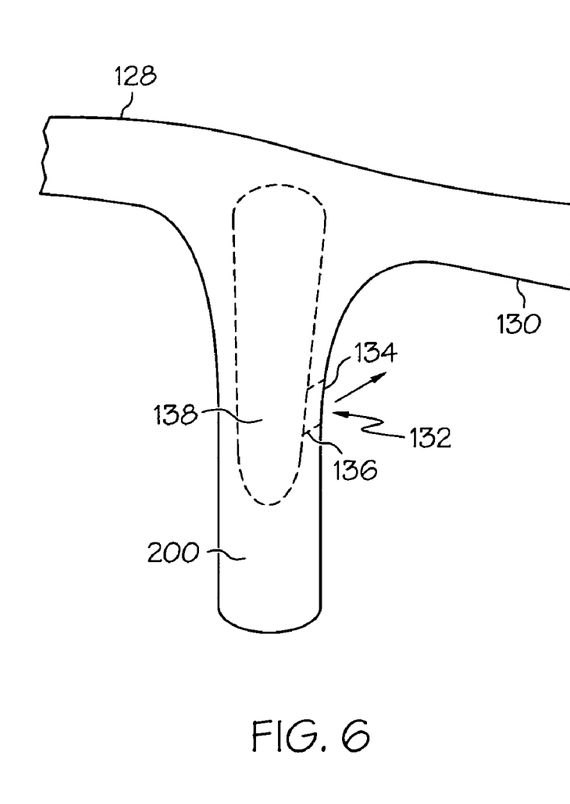
FIG. 6 is a detailed view of a region of another embodiment of a turbine blade assembly.

FIG. 6 illustrates an alternative embodiment, wherein the ports 132 are adjusted to impinge the fluid directly against the lower surface 130. Unless otherwise specified, the characteristics of elements described in FIG. 6 are similar to that embodiment illustrated and described above. Thus, while one detailed section is shown and described, the number of ports 132 associated with each rib 200, as well as the total number of ports 132 can vary between embodiments.

Each port 132 in FIG. 6 consists of a conduit 136 connecting the cavity 138 with an outlet 134 that is generally directed toward the lower surface 130. As with other embodiments, the number, size, and arrangement of ports 132 can be chosen as desired for the embodiment. Additionally, such characteristics as the placement and angle of travel of the conduit 136 can be adjusted to obtain desired cooling effects from a fluid traveling therein. Thus, preferably, a fluid flowing into the cavity 138 will flow through the conduit 136, exit the rib 200 through the outlet 134 and impinge on the lower surface 130. The fluid is illustrated by an arrow indicating its direction of travel. The location of impingement can be adjusted through placement, sizing, and angling of the components, such as the ports 132. Preferably, the fluid is directed to locations where higher temperatures are predicted during operation of the turbine blade assembly 100.

Figure 7:
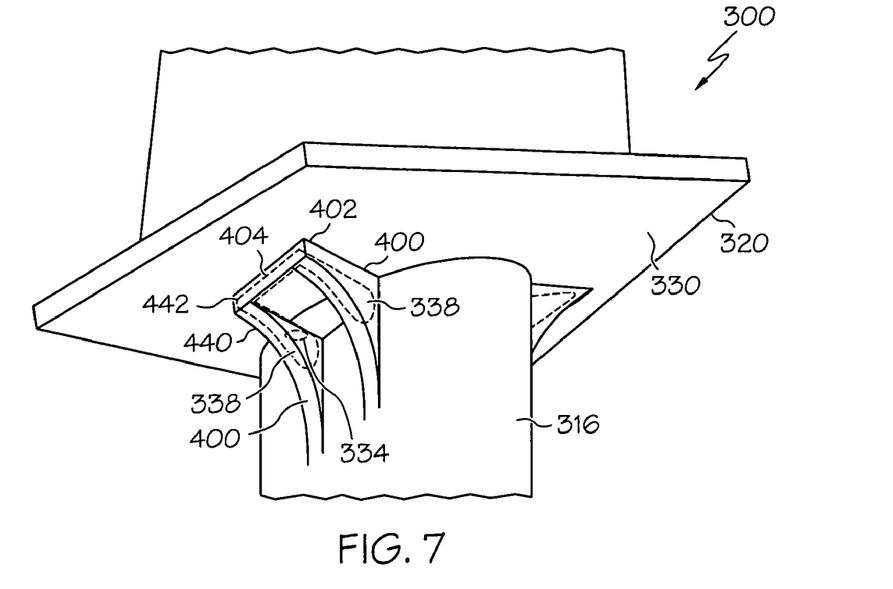
FIG. 7 is a perspective view of an underside of another embodiment of a turbine blade assembly.
Figure 8:
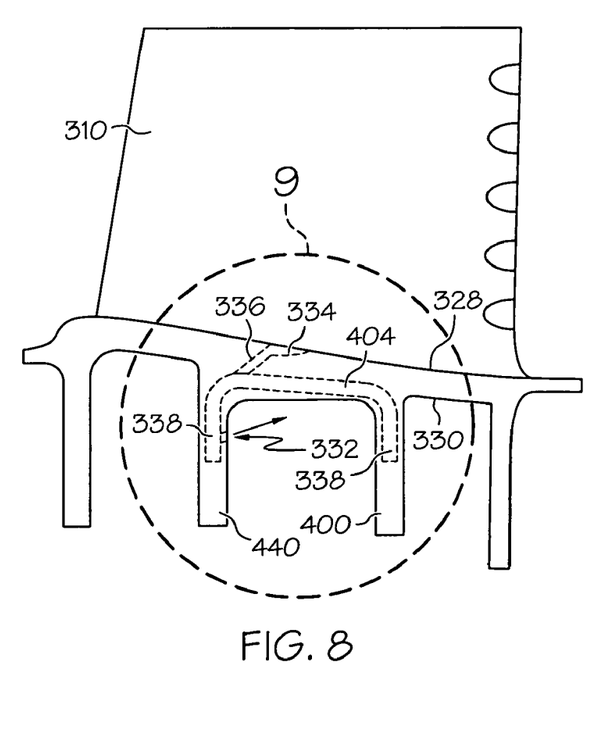
FIG. 8 is a side view of the turbine blade assembly of FIG. 7.
Figure 9:
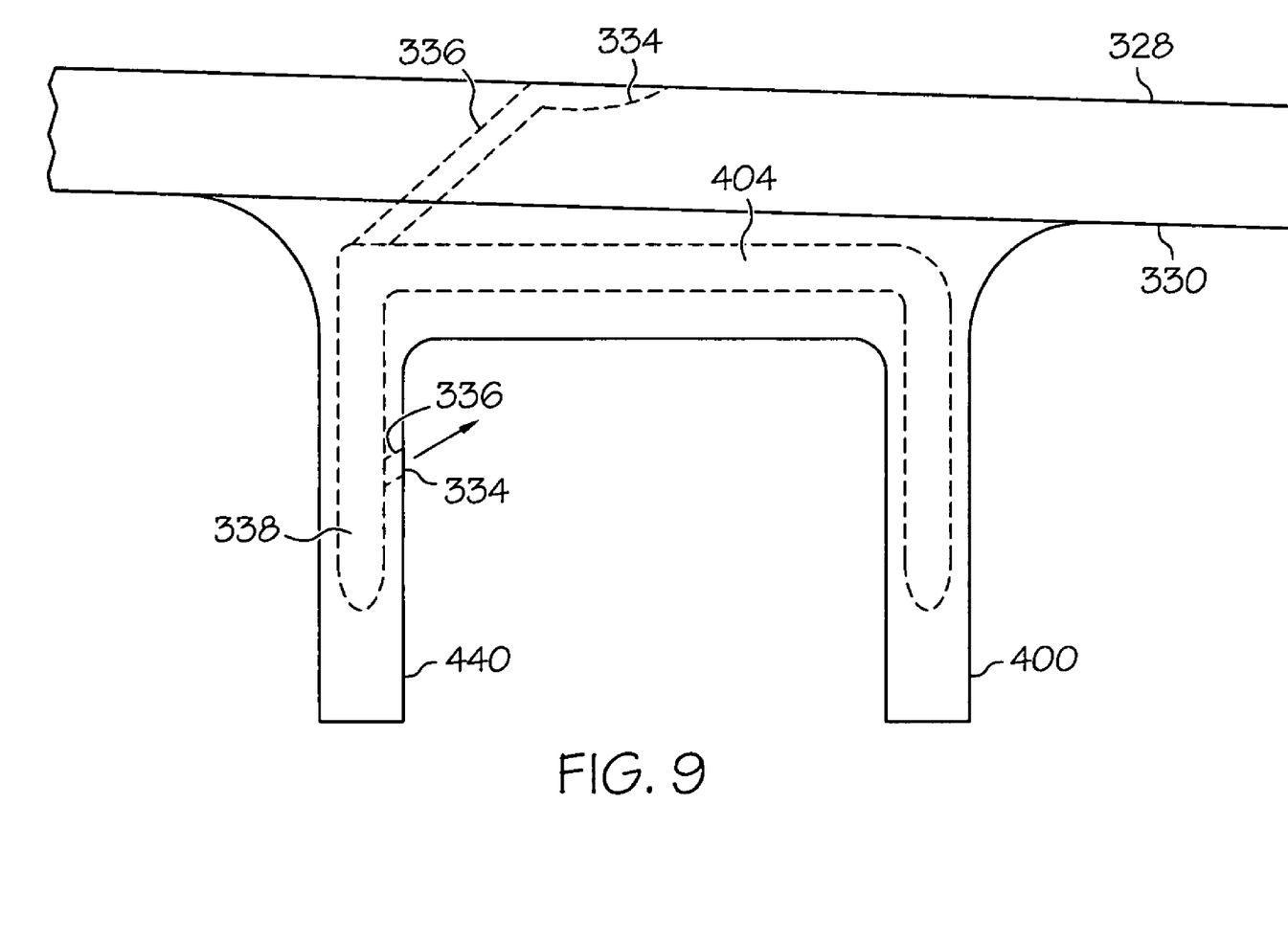
FIG. 9 is a detailed view of a region of the turbine blade assembly of FIG. 8.

FIGS. 7-9 illustrate another embodiment of a turbine blade assembly 300. Except where noted, the components and features indicated by numerical indicators shown in FIGS. 7-9 correspond to those of previous embodiments, except that the numerical indicator has been incremented by 200.

FIGS. 7-9 illustrate an embodiment of the turbine blade assembly 300 wherein the cavities 338 within one or more ribs 400 are fluid connected through a conduit 404 extending between the remote tips 402, 442 of the ribs 400, 440. FIG. 7 illustrates an underside perspective view of the platform 320. The conduit 404 can be formed on the lower surface 330 of the platform 320, or within the platform 320, as desired for the embodiment. The conduit 404 can be surrounded by material from the platform 320, the ribs 400, 440 or a different material, if desired. As shown, a portion of the ribs 400, 440 can extend between the remote tips 402, enclosing the conduit 404. Preferably, the conduit 404 permits fluid to flow near the lower surface 330 of the platform 320, enhancing cooling to the surrounding areas.

FIG. 8 illustrates a side view of the embodiment of FIG. 7. As shown in FIG. 8, the conduit 404 can extend between the remote tips 402, 442 of two ribs 400, 442. Although only one conduit 404 is shown between two ribs 400, 440 at the remote tips 402, 442, other conduit configurations can be formed as well. For example, in certain configurations of the ribs 400, 440, a conduit 404 can extend between the middle portions of the ribs 400, 440 or between portions of the ribs 400, 440 near the blade root 316. In certain configurations, the region of the blade root cavity 142 near the ribs 400, 440 can be extended into the platform 320, allowing for greater fluid exchange between the ribs 400, 440.

FIG. 9 illustrates a detailed view of a portion of the side view of FIG. 8. Although illustrated throughout FIGS. 7-9, other features of the platform 320 previously described can be easily seen in FIG. 9. Such features in appropriate combinations and configurations can be present in embodiments containing the conduit(s) 404. For example, the ribs 400, 440 can comprise conduits 336 connecting a cavity 338 with an output 334. Similar to those shown above, fluid can be directed to impinge the lower surface 330 for localized cooling. Additionally, fluid can be passed through conduits 336 and outlets 334 on the upper surface 328 for film-layer cooling as well.

Figure 10:
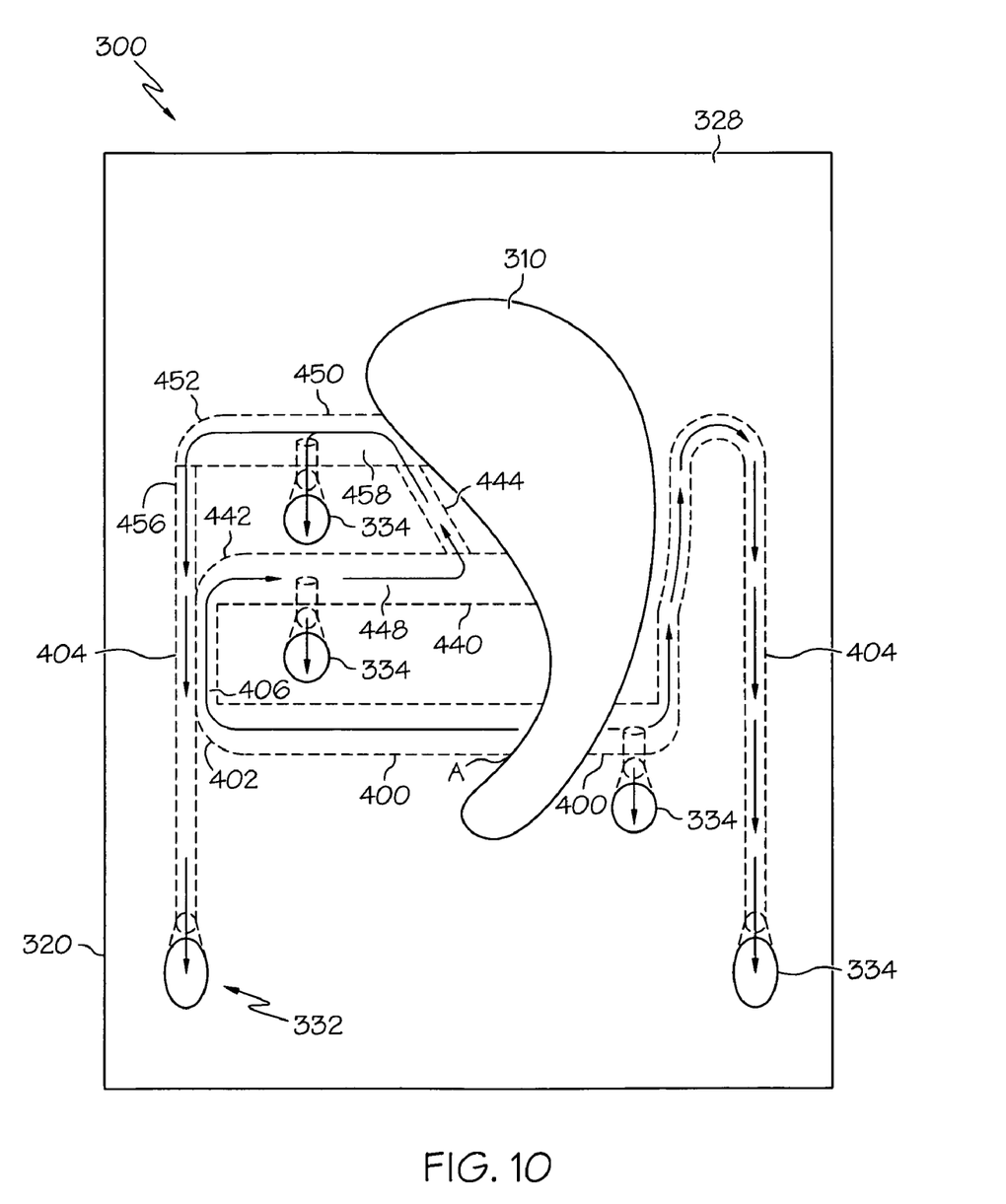
FIG. 10 is a top view of another embodiment of a turbine blade assembly.

FIG. 10 illustrates an embodiment of another turbine blade assembly 300. As shown in FIG. 10. one or more channels of fluid flow can be formed in the ribs 400, creating a passage for cooling fluid to follow. The channels can be formed by conduits 404, 406, 444, 456 formed both near the remote tips 402, 442, 452 as conduits 404, 406, 456 as well as conduits formed near the blade root 316, as conduit 444. While one configuration is shown in FIG. 10, other configurations are possible, depending on the desired placement of conduits 404, 406, 444, 456, outlets 334, ribs 400, 440, 450 and so on.

The platform 320 of FIG. 10 has a directed flow path for cooling fluid exiting from the turbine blade cavity 340 and/or blade root cavity 342. Cooling fluid can leave the cavities 340, 342 and flow into the inner cavity of rib 400 at site A. Flow of the fluid is illustrated through the use of arrows. Upon reaching the conduit 406, the fluid can flow through a portion of the conduit 406 to a cavity 448 in an adjacent rib 440. Conduits 404, 406, 444, 456 can have partitions, segments, walls, and other features designed to direct fluid flow therewithin.

After reaching the rib cavity 448, the fluid can travel inward toward the turbine blade airfoil 310. Some of the fluid can exit through the outlet 334, while some can travel to conduit 444. The outlet 334 can direct fluid either to the upper surface 328 for film-layer cooling, or upwards to impinge the lower surface 330, as previously described. The selection of outlet placement can vary between embodiments, as desired. Within conduit 444, the fluid can travel to reach a cavity 458 within a third rib 450. The fluid can travel outward again, away from the turbine blade airfoil 310. One or more outlets 334 can be positioned along the third rib cavity 458. After reaching the remote tip 452 in the third rib cavity 458, the fluid can be directed to flow through another conduit 456 back toward the second rib 440. The fluid can continue through conduit 404, cooling the platform 320. The fluid can continue through conduit 404, which can be a separate conduit, or conduits 404 and 406 can comprise a single segmented or partitioned conduit. The fluid can then exit through one or more ports 332. Ports 332 can have outlets 334 which create film cooling on the upper surface 328 of the blade platform 320 or can impinge on the lower surface 330 as previously described. Ports 332 also can have outlets 334 directed toward the lower surface 330 to cool the trailing edge region of the platform 320.

It should be understood that while one configuration of fluid flow through a system of ribs, ducts, and ports has been described, other combinations and configurations can be formed consistent with aspects of the embodiments described here. Accordingly, certain embodiments where conduits are multiply connected through different ribs, as well as connecting a plurality of ribs are possible, with attendant variant configurations of outlets, ports, and so on.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A turbine blade assembly comprising:
a turbine blade comprising a cavity; and
a blade platform supporting the turbine blade, the cavity extending into the blade platform, and the blade platform comprising;
an upper surface adjacent the turbine blade;
a lower surface comprising a first rib, the cavity extending into the first rib, the first rib coupled to the lower surface, tapering as it extends away from the turbine blade, and comprising a first port extending from the cavity to the upper surface.

2. The turbine blade assembly of claim 1, further comprising a plurality of ribs, each rib tapering as it extends away from the turbine blade, and the cavity extending into each of the plurality of ribs.

3. The turbine blade assembly of claim 2, wherein each of the plurality of ribs comprises a respective port extending from the cavity to the upper surface.

4. The turbine blade assembly of claim 1, wherein the first rib is integrally formed with the lower surface.

5. The turbine blade assembly of claim 1, wherein the blade platform has a trailing edge and the first port extends from the rib toward the trailing edge.

6. The turbine blade assembly of claim 1, wherein the first port has a teardrop-shape opening on the upper surface.

7. The turbine blade assembly of claim 1, wherein the first rib comprises a curved surface.

8. The turbine blade assembly of claim 1, wherein the blade platform further comprises: a second rib, the cavity extending into the second rib, and the second rib tapering as it extends away from the turbine blade; and a conduit, the conduit connecting the first rib and the second rib.

9. A turbine blade assembly comprising:
a turbine blade comprising a cavity; and
a blade platform supporting the turbine blade, the cavity extending into the blade platform, and the blade platform comprising; an upper surface adjacent the turbine blade; and a lower surface comprising a first rib, the first rib extending downward from the lower surface, the cavity extending into the first rib, the first rib tapering as it extends away from the turbine blade, and the first rib comprising a first port, the first port adapted to direct a fluid from within the cavity to impinge the lower surface adjacent the first rib.

10. The turbine blade assembly of claim 9, wherein the first rib is integrally formed with the lower surface.

11. The turbine blade assembly of claim 9, wherein the first port comprises a first outlet and a first conduit, the first outlet disposed on the surface of the first rib and the first conduit extending from the cavity to the first outlet.

12. The turbine blade assembly of claim 11, wherein the first conduit extends upwards towards the lower surface.

13. The turbine blade assembly of claim 9, further comprising a plurality of ribs, the cavity extending into each rib, each rib tapering as it extends away from the turbine blade.

14. The turbine blade assembly of claim 13, wherein each one of the plurality of ribs comprises a respective one of a plurality of ports, each one of the plurality of ports adapted to direct a fluid from within the cavity to impinge the lower surface adjacent the one of the plurality of ribs.

15. A turbine blade assembly comprising:
a turbine blade comprising a first cavity; and
a blade platform supporting the turbine blade, the first cavity extending into the blade platform, the blade platform having a first lateral side, and comprising; an upper surface adjacent the turbine blade;

a lower surface comprising: a first rib extending away from the turbine blade, the first rib comprising a second cavity and a first remote tip proximate the first lateral side, the first and second cavities in fluid communication; and a second rib extending away from the turbine blade, the second rib comprising a third cavity and a second remote tip proximate the first lateral side, the first and third cavities in fluid communication; and a first conduit extending from the first remote tip to the second remote tip and placing the second and third cavities in fluid communication.

16. The turbine blade assembly of claim 15, wherein the blade platform has a trailing edge, and the blade platform further comprises a first port and a second conduit, the first port disposed near the trailing edge, and the second conduit extending from the second cavity to the first port.

17. The turbine blade assembly of claim 16, further comprising a third conduit, the third conduit connecting the third cavity and the second conduit.

18. The turbine blade assembly of claim 15, further comprising a first port, the first port extending from the second cavity to the upper surface.

19. The turbine blade assembly of claim 18, further comprising a second port, the second port extending from the third cavity to the upper surface.

20. The turbine blade assembly of claim 15, further comprising a second conduit proximate the turbine blade, the second conduit extending from the second cavity to the third cavity and placing the second and third cavities in fluid communication.

* * * * *